United States Patent
Daimer et al.

(10) Patent No.: US 11,428,158 B2
(45) Date of Patent: Aug. 30, 2022

(54) SHAFT-HUB CONNECTION

(71) Applicant: Robert Bosch GmbH, Stuttgart (DE)

(72) Inventors: Guido Daimer, Remseck (DE); Steffen Derhardt, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 1077 days.

(21) Appl. No.: 16/071,417

(22) PCT Filed: Dec. 22, 2016

(86) PCT No.: PCT/EP2016/082292
§ 371 (c)(1),
(2) Date: Jul. 19, 2018

(87) PCT Pub. No.: WO2017/125237
PCT Pub. Date: Jul. 27, 2017

(65) Prior Publication Data
US 2020/0386153 A1 Dec. 10, 2020

(30) Foreign Application Priority Data
Jan. 19, 2016 (DE) ...................... 10 2016 200 628.2

(51) Int. Cl.
*F02C 1/00* (2006.01)
*F02B 33/40* (2006.01)
(Continued)

(52) U.S. Cl.
CPC .............. *F02C 1/007* (2013.01); *F02B 33/40* (2013.01); *F04D 29/18* (2013.01); *F16D 1/064* (2013.01);
(Continued)

(58) Field of Classification Search
CPC .......... F01D 5/025; F02B 33/40; F02C 1/007; F04D 29/18; F04D 29/20; F04D 29/266;
(Continued)

(56) References Cited

U.S. PATENT DOCUMENTS 2,143,484 A * 1/1939 Jacobsen ................. F04D 29/20
403/301
2,956,826 A * 10/1960 Nord ................... B23B 31/1177
403/368
(Continued)

FOREIGN PATENT DOCUMENTS

CN 104806562 A 7/2015
CN 104884748 A 9/2015
(Continued)

OTHER PUBLICATIONS

International Search Report for Application No. PCT/EP2016/082292 dated Mar. 28, 2017 (English Translation, 3 pages).

*Primary Examiner* — Jesse S Bogue
(74) *Attorney, Agent, or Firm* — Michael Best & Friedrich LLP

(57) ABSTRACT

The invention relates to a shaft-hub connection (1), particularly for mounting a rotor wheel on a shaft (10). The shaft-hub connection (1) comprises a shaft (10), a hub (20) and a filler material (30). The shaft (10) comprises an end section (11) on one end. A receiving region (21) is arranged in the hub (20). The end section (11) is arranged in the receiving region (21), with an intermediate layer of the filler material (30) positioned inbetween. The filler material (30) forms undercuts in the axial and rotational direction, in relation to the end section (11) and in relation to the receiving region (21), so as to create a positive embodiment of the shaft-hub connnection (1).

18 Claims, 6 Drawing Sheets

(51) Int. Cl.
*F04D 29/18* (2006.01)
*F16D 1/064* (2006.01)
*F16D 1/10* (2006.01)
*F16D 1/068* (2006.01)

(52) U.S. Cl.
CPC ............ *F16D 1/10* (2013.01); *F05D 2220/32* (2013.01); *F05D 2240/60* (2013.01); *F16D 1/068* (2013.01); *F16D 2001/103* (2013.01)

(58) Field of Classification Search
CPC ............ F05D 2220/32; F05D 2220/40; F05D 2230/23; F05D 2240/60; F05D 2260/36; F16D 1/06; F16D 1/064; F16D 1/068; F16D 1/10; F16D 2001/103; Y02T 10/12
See application file for complete search history.

(56) References Cited

U.S. PATENT DOCUMENTS

| | | | | |
|---|---|---|---|---|
| 4,518,315 | A * | 5/1985 | Kruger | F01D 5/284 416/241 B |
| 4,832,573 | A | 5/1989 | Dorski | |
| 4,915,589 | A * | 4/1990 | Gessler | F01D 5/025 415/217.1 |
| 5,163,816 | A * | 11/1992 | Goetzke | F01D 5/025 403/259 |
| 5,580,216 | A * | 12/1996 | Munsch | F04D 13/026 415/217.1 |
| 5,632,685 | A * | 5/1997 | Myers | F16D 1/068 403/268 |
| 5,647,683 | A * | 7/1997 | Easley | B60B 27/001 403/267 |
| 5,961,246 | A * | 10/1999 | Mitsubori | F04D 29/266 403/375 |
| 5,961,247 | A * | 10/1999 | Gold | F01D 5/025 403/370 |
| 7,103,957 | B2 * | 9/2006 | Fonville | F16H 41/24 29/469 |
| 2005/0042105 | A1 * | 2/2005 | Nishiyama | F16D 1/06 416/183 |
| 2006/0196183 | A1 * | 9/2006 | Isogai | F02D 23/02 60/599 |
| 2010/0190559 | A1 | 7/2010 | Duncan | |
| 2016/0003510 | A1 * | 1/2016 | De Larminat | F04D 29/5806 62/470 |
| 2016/0123378 | A1 * | 5/2016 | Mintzlaff | F16C 3/026 403/268 |
| 2017/0082061 | A1 * | 3/2017 | Mizoguchi | F02G 5/02 |

FOREIGN PATENT DOCUMENTS

| | | |
|---|---|---|
| DE | 1711030 U | 11/1955 |
| DE | 102004001386 B3 | 7/2005 |
| DE | 202007014997 | 2/2008 |
| DE | 102010010136 A1 | 9/2011 |
| DE | 102010040288 | 3/2012 |
| DE | 102010043198 | 5/2012 |
| DE | 102013213966 B3 | 6/2014 |
| GB | 1069591 | 5/1967 |
| JP | S5891925 A | 6/1983 |
| JP | 2650372 B2 | 9/1997 |
| JP | 2009275608 A | 11/2009 |
| WO | 2013178406 | 12/2013 |

* cited by examiner

SHAFT-HUB CONNECTION

BACKGROUND OF THE INVENTION

The invention relates to a shaft-hub connection, in particular for connecting a rotor wheel on a shaft.

Shaft-hub connections are known in a variety of constructions from the prior art, for example from the textbook "Roloff/Matek Maschinenelemente: Normung, Berechnung, Gestaltung" [Machine Elements: Standardization, Calculation, Design] (Vieweg+Teubner Verlag).

However, the known shaft-hub connections do not combine the properties of low height, high force and moment transmission and high strength in one. For example, although a splined shaft connection has a high moment transmission, it is less suitable for transmitting axial forces; for this it would in turn be necessary to provide an additional axial securing means which in turn requires additional installation space.

SUMMARY OF THE INVENTION

In contrast, the shaft-hub connection according to the invention has high force and moment transmissions and high strength with only a low height.

To this end, the shaft-hub connection comprises a shaft, a hub and a filler material. The shaft has an end portion at one end. A receiving region is arranged in the hub. The end portion is arranged in the receiving region with the interposition of the filler material. The filler material forms undercuts with respect to the end portion and with respect to the receiving region in the axial and rotary direction so that the shaft-hub connection is constructed with form fit.

As a result of the form-fitting undercuts, it is possible to transmit very high forces and moments without the strength being negatively influenced by prestresses. Furthermore, the connection is arranged in the receiving region of the hub in an inherently space-saving manner; additional machine elements such as screws are thus omitted. The undercuts in the shaft-hub connection are preferably constructed without play so that the force and moment transmission takes place in a loss- and shock-free manner. The efficiency and useful life of the shaft-hub connection are therefore also maximized.

The shaft-hub connection according to the invention is particularly suitable for assembling a rotor wheel on a shaft, wherein the rotor wheel forms the hub. As a result of arranging the shaft-hub connection inside the rotor wheel, it does not affect the flow geometry of the rotor wheel.

In an advantageous further development, the end portion has a positioning portion. The filler material forms a rotary undercut with structures formed on the positioning portion. The rotary undercut therefore serves for very high torque transmission. The structures are preferably formed such that they have comparatively low notch effects to ensure high strength of the shaft-hub connection.

The structures are advantageously formed as grooves in the axial direction. A plurality of grooves are preferably arranged distributed over the circumference here. This results in a particularly high and also uniform torque transmission.

In advantageous embodiments, the end portion has a connecting portion adjacent to the positioning portion. The filler material forms an axial undercut with the transition from the positioning portion to the connecting portion. Very high axial forces can be transmitted as a result of the axial undercut. The transition from the portioning portion to the connecting portion is preferably formed such that it has comparatively low notch effects to ensure a high strength of the shaft-hub connection.

Both the rotary and the axial undercut are very advantageously arranged inside the hub or the rotor wheel. The shaft-hub connection is thus constructed in a very space-saving manner; at the same time, the outer geometries of the shaft and in particular also the hub are not negatively influenced by other connecting techniques, for example screw connections.

In advantageous further developments, the receiving region has a positioning region, wherein the filler material forms a further rotary undercut with geometries formed on the positioning region. The further rotary undercut therefore serves for very high torque transmission. The geometries are preferably formed such that they have comparatively low notch effects to ensure high strength of the shaft-hub connection.

The geometries are advantageously formed as through grooves in the axial direction. A plurality of through grooves are preferably arranged distributed over the circumference here. This results in a particularly high and also uniform torque transmission.

In advantageous embodiments, the positioning region is arranged to surround the positioning portion externally. This optimizes the moment transmission between the shaft and the hub; disadvantageous torsion of the filler material is therefore prevented.

In advantageous further developments, an outer diameter $D_{11a}$ of the positioning portion is the same size as an inner diameter $D_{21a}$ of the positioning region. The positioning portion thus cooperates with the positioning region in the radial direction so that a coaxial alignment of the shaft with respect to the hub is achieved.

At least one undercut surface is advantageously formed on the positioning region. The filler material forms an axial undercut with the at least one undercut surface. It is also optionally possible to provide a plurality of undercuts. The axial undercut acts in such a way that it prevents the filler material from being pulled out of the hub; the undercut surfaces are therefore directed inside the receiving region.

In advantageous further developments, the end portion has a connecting portion adjacent to the positioning portion and a displacement portion adjoining said connecting portion. At least one axial surface is formed on the displacement portion. The filler material forms a further axial undercut with the at least one axial surface. It is also optionally possible to provide a plurality of axial surfaces. The further axial undercut acts in such a way that it prevents the shaft from being pulled out of the filler material; the axial surfaces are therefore directed out of the receiving region.

In advantageous embodiments, an end face formed on the hub cooperates with a shoulder formed on the shaft in the axial direction of the shaft. This produces an axial stop of the shaft against the hub during the assembly of the shaft-hub connection so that the shaft can be clearly positioned with respect to the hub in the axial direction. Axial tolerances of the shaft-hub connection are thus minimized.

The filler material advantageously consists of a casting compound which hardens independently or under the effect of temperature. The manufacturing process of the shaft-hub connection is thus implemented in a very simple manner.

The filler material preferably consists of an adhesive or an elastomer here. The shaft-hub connection thus has good damping properties and can therefore damp impact loads effectively.

In further embodiments according to the invention, the shaft-hub connection is used in a turbine. The turbine here comprises a rotor wheel arranged on a shaft. The rotor wheel is arranged on the shaft by means of a shaft-hub connection described above. The rotor wheel here represents the hub of the shaft-hub connection. As a result of the compact design of the shaft-hub connection, the rotor wheel can also be constructed very small without having a negative influence on the flow geometry of the rotor wheel.

In advantageous embodiments, the turbine is arranged within a waste heat recovery system of an internal combustion engine. The waste heat recovery system has a circuit guiding a working medium. The circuit comprises a pump, an evaporator, a bypass valve, an expansion machine and a condenser in the flow direction. The expansion machine is constructed as a turbine having a shaft-hub connection according to the invention. For this application, the operating conditions of the turbine change very frequently, and with this the number of revolutions of the rotor wheel. The play-free construction of the shaft-hub connection is particularly well suited to this. In particular when applied in the automotive field, a small size of the waste heat recovery system and therefore also of the turbine is furthermore necessary, for which the above-described embodiments of the shaft-hub connection are particularly suitable.

In another advantageous embodiment, the turbine is arranged in a heat pump. The heat pump comprises a condenser, an evaporator and a turbine, wherein the rotor wheel of the turbine acts as a compressor between the evaporator and the condenser. As a result of the small size and the ability to transmit high torques, the shaft-hub connection according to the invention is particularly suitable for a heat pump.

In a further advantageous embodiment, the turbine is arranged in a micro gas turbine, wherein the rotor wheel of the turbine acts as a compressor for a turbine impeller of the micro gas turbine. As a result of the small size and the ability to transmit high torques, the turbine having the shaft-hub connection according to the invention is particularly suitable as a compressor of a micro gas turbine.

Alternatively, the rotor wheel can also act as a turbine impeller of the micro gas turbine.

In a further advantageous embodiment, the turbine is arranged in an internal combustion engine, wherein the rotor wheel of the turbine acts as an auxiliary compressor for compressing the combustion air supplied to the internal combustion engine. The requirements for a rotor wheel of this type are small size, high moment transmission and high strength. Consequently, the shaft-hub connection according to the invention is therefore very suitable as a connecting technique between the shaft and the rotor wheel.

DETAILED DESCRIPTION

Figure 1:
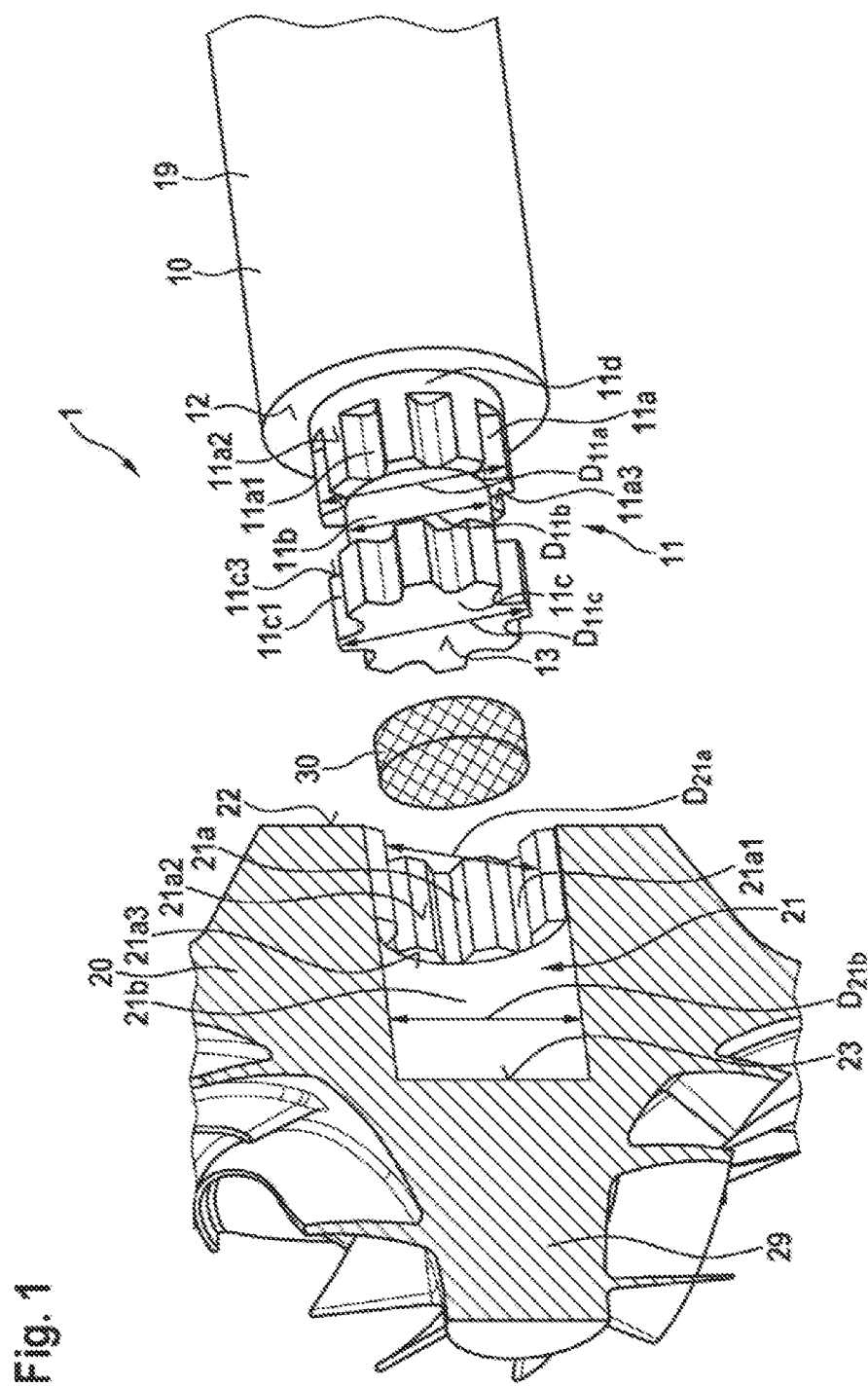
FIG. 1 shows the integral parts of a shaft-hub connection prior to assembly, wherein only the essential regions are illustrated.

FIG. 1 shows a shaft 10, a hub 20 of a rotor wheel and a filler material 30, which are joined in an assembled state to form a shaft-hub connection 1. FIG. 1 here shows the state of the two components shaft 10 and hub 20 and of the filler material 30 before being joined to form the shaft-hub connection 1. According to the invention, the filler material 30 is extensively shaped or plasticized during the joining procedure of the shaft-hub connection 1 so that form-fitting connections are produced. It is thus possible for very high forces and moments to be transmitted, higher than with conventional pressed connections or toothed or keyed connections, for example.

In the exemplary embodiment of FIG. 1, the filler material 30 is extensively shaped during the joining of the shaft-hub connection 1, possibly with extensive heating of the filler material 30. To this end, the filler material 30 can also be designed in a ring shape or as a hollow cylinder. The shaft 10 has a three-part end portion 11, wherein the end portion 11 has a reduced diameter compared to a center region 19 of the shaft 10. The hub 20 has a receiving region 21 in the form of a recess of virtually any complexity. In the exemplary embodiment of FIG. 1, the receiving region 21 is constructed in two parts.

The end portion 11 is that region of the shaft 10 which, in the assembled state of the shaft-hub connection 1, cooperates with the receiving region 21 of the hub 20, possibly with the interposition of the filler material 30, to transmit forces and moments.

The inner geometry of the hub 20, i.e. the geometry of the receiving region 21, and the outer geometry of the end portion 11 of the shaft 10 have both radial and axial geometries.

The receiving region 21 has a positioning region 21a and an undercut region 21b. The end portion 11 has, from the inside out, a positioning portion 11a, a connecting portion 11b and a displacement portion 11c. The connecting portion 11b and the displacement portion 11c are those regions of the shaft 10 which, in the assembled end state of the shaft-hub connection 1, are arranged in the undercut region 21b. The positioning portion 11a cooperates with the positioning region 21a with form fit, advantageously with the interposition of the filler material 30, in such a way that the shaft 10 and the hub 20 are prevented from rotating relative to one another and being displaced relative to one another.

To position the shaft 10 axially with respect to the hub 20, a pair of stop surfaces is formed on the shaft 10 or hub 20, wherein two alternatives are provided:

an end face 22 formed on the hub 20 cooperates with a shoulder 12 formed on the shaft 10 in the axial direction of the shaft 10. The shoulder 12 here is the end-face surface at the transition from the end portion 11 to the center region 19 of the shaft 10;

a bore base 23 formed in the receiving region 21 cooperates with a cover surface 13 formed on the displacement portion 11c. The cover surface 13 here is the end face of the displacement portion 11c and therefore the outermost end face of the shaft 10.

The pair of stop surfaces, i.e. end face 22/shoulder 12, or bore base 23/cover surface 13, positions the shaft 10 with respect to the hub 20 in the axial direction upon contact during assembly. The stop surfaces shoulder 12 and end face 22 are preferably used here since they are pressed against one another without the interposition of the filler material 30.

When joining the shaft-hub connection 1, the filler material 30 is primarily displaced by the end portion 11 in such a way that it is arranged in a ring shape around the connecting portion 11b and the displacement portion 11c, i.e. it is axially clamped, as it were, between the positioning portion 11a and the displacement portion 11c. C.f. also FIG. 3 in this regard.

However, the filler material 30 preferably fills all cavities between the end portion 11 and the receiving region 21, i.e. also between the positioning portion 11a and the positioning region 21a. C.f. also FIG. 2 in this regard. To this end, between the positioning portion 11a and the center portion 19, the end portion 11 preferably has a further cylindrical ring portion 11d which prevents the filler material 30 from escaping from the cavities between the end portion 11 and the receiving portion 21.

In the exemplary embodiment of FIG. 1, the positioning portion 11a and the displacement portion 11c are realized in the form of a splined shaft; the connecting portion 11b cylindrically. It is advantageous here that the diameter $D_{11b}$ of the connecting portion 11b is smaller than the outer diameter $D_{11a}$ of the positioning portion 11a and also smaller than the outer diameter $D_{11c}$ of the displacement portion 11c; this produces axial undercuts of the shaft 10 with respect to the filler material 30.

Figure 4:
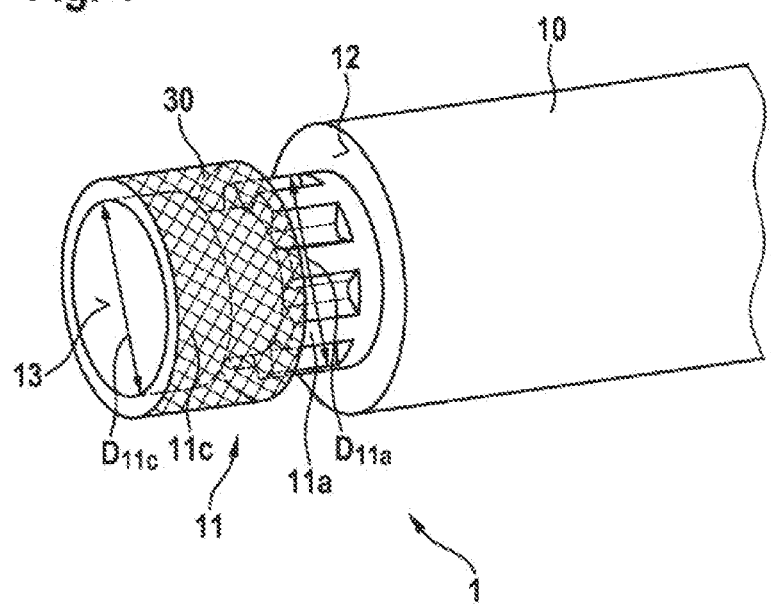
FIG. 4 shows a further embodiment of the shaft-hub connection according to the invention in the assembled state, wherein the hub is hidden.

The displacement portion 11c and the connecting portion 11a advantageously have the same geometry in terms of their cross-section in order to minimize production costs. The geometry of the displacement portion 11c should be selected here such that it can be pushed over the positioning region 21a during assembly. The cavity between the displacement portion 11c and the undercut region 21b should preferably be kept as small as possible so that this cavity does not need to be filled with too much filler material 30, since, in some embodiments—especially without relatively high axial forces—this cavity is not significant for the function of the shaft-hub connection 1. An example having a cylindrical displacement portion 11c is shown in FIG. 4.

In the exemplary embodiment of FIG. 1, the positioning portion 11a is preferably designed in the form of a splined shaft, having grooves 11a1 to achieve an anchoring of the filler material 30 in these grooves 11a1; this produces rotary undercuts. The displacement portion 11c can likewise optionally have grooves 11c1 of this type, as illustrated in FIG. 1. The positioning region 21a furthermore has through grooves 21a1, likewise for anchoring the filler material or for producing further rotary undercuts.

In the embodiment of FIG. 1, the undercut region 21b is constructed as a cylinder with a diameter $D_{21b}$, where $D_{21b}$ is greater than the inner diameter $D_{21a}$ of the positioning region 21a; this produces an undercut of the filler material 30 with respect to the hub 20 at the transition from the undercut region 21b to the positioning region 21a.

The undercuts of the filler material 30 with respect to the shaft 10 and with respect to the hub 20 cooperate such that the filler material 30 prevents the shaft 10 from being pulled out of the hub 20. The shaft-hub connection 1 can therefore only be dismantled if the filler material 30 is melted again.

The torque transmission between the shaft 10 and the hub 20 or rotor wheel 20 takes place predominantly via the positioning portion 11a, the filler material 30 and the positioning region 21a. The filler material is anchored in the grooves 11a1 of the shaft 10 and in the through grooves 21a1 of the hub 20 and therefore produces a form fit with respect to the shaft 10 and the hub 20 in the direction of rotation. In the embodiment of FIG. 1, the number of grooves 11a1 and through grooves 21a1 can also differ accordingly.

Figure 5:
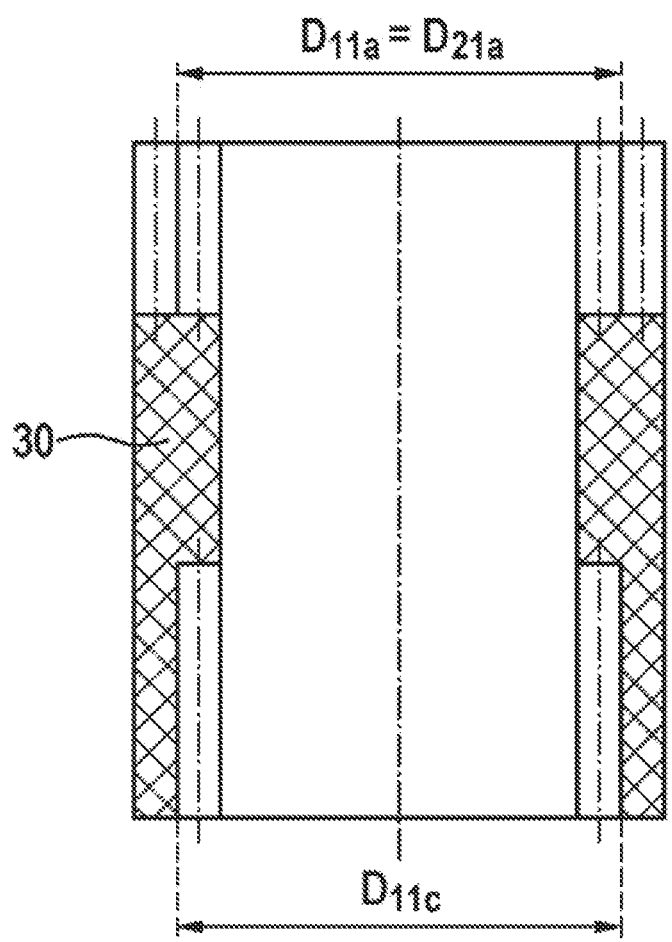
FIG. 5 shows a longitudinal section through the filler material of the shaft-hub connection in a further embodiment.

The outer diameter $D_{11a}$ of the positioning portion 11a is then advantageously not greater than the inner diameter $D_{21a}$ of the positioning region 21a. $D_{11a}$ and $D_{21a}$ are preferably the same size so that the outer diameter $D_{11a}$ and the inner diameter $D_{21a}$ cooperate in such a way that they bring about a coaxial alignment of the hub 20 with respect to the shaft 10, as also shown in FIG. 5.

To this end, outer surfaces 11a2 are formed on the positioning portion 11a, more precisely on the teeth between the grooves 11a1, which outer surfaces 11a2 in total produce a cylindrical surface of the diameter $D_{11a}$ with cutouts. Analogously to this, inner surfaces 21a2 are formed on the positioning region 21a, more precisely on the teeth between the through grooves 21a1, which inner surfaces in total produce a cylindrical surface of the diameter $D_{21a}$ with cutouts. In the context of the production tolerances, $D_{11a}=D_{11a}$ for the coaxial positioning of the shaft 10 and the hub 20 in this embodiment. The number of outer surfaces 11a2 and inner surfaces 21a2 is preferably the same here.

In further developments of the embodiment of FIG. 1, the positioning portion 11a and the positioning region 21a can also be designed such that they form a splined shaft connection—possibly with the interposition of the filler material 30. In the context of the production and fit tolerances, the positioning region 21a then has the negative form of the positioning portion 11a. In these embodiments, the outer diameter $D_{11a}$ of the positioning portion 11a is then correspondingly greater than the inner diameter $D_{21a}$ of the positioning region 21a.

The shaft 10 is advantageously clamped to the hub 20 without play in the axial direction via the filler material 30. The axial force flow then acts via the pair of stop surfaces—i.e. end face 22/shoulder 12, or bore base 23/cover surface 13—and the axial undercuts of the filler material 30 with respect to the receiving region 21 and the end region 11: to this end, axial surfaces 11a3, 11c3 are formed on the displacement portion 11c—and optionally on the positioning portion 11a—advantageously as end faces of the grooves 11a1, 11c1. Axial surfaces are furthermore likewise formed as undercut surfaces 21a3 on the positioning region 21a, advantageously as end faces of the through grooves 21a1.

A plurality of undercuts are therefore formed in the axial direction:

an axial undercut between the filler material 30 and the undercut surfaces 21a3 of the positioning region 21a. This prevents the filler material 30 from being pulled out of the hub 20;

an optional axial undercut between the filler material 30 and the axial surfaces 11a3 of the positioning portion 11a;

a further axial undercut between the filler material 30 and the axial surfaces 11c3 of the displacement portion 11c. This prevents the shaft 10 from being pulled out of the filler material 30.

The dimensioning of the undercut region 21b, the connecting portion 11b, the displacement portion 11c, the positioning region 21a, the positioning portion 11a and the filler material 30 have to be matched to one another such that a high filling level can be achieved after the assembly of the shaft-hub connection 1. The filler material 30 can be for example a metal, which melts during the assembly through heating (e.g. by means of induction) and is pressed into the undercut region 21b through the insertion of the shaft 10 into the hub 20.

However, the filler material 30 can alternatively also be a 2 component adhesive, which is added in liquid form, is then distributed into the undercut region 21b and possibly into the positioning region 21a during assembly and subsequently hardens. The hardening here preferably takes place independently. It is likewise possible to use other materials such as elastomers or various granulates as the filler material 30. If an elastomer is used as the filler material 30, the shaft-hub connection 1 has a high damping level. If a granulate is used as the filler material 30, it is optionally possible to carry out a thermal treatment of the assembled shaft-hub connection 1 so that the filler material 30 reaches its final strength.

It is expediently possible to assemble the shaft 10 in the receiving region 21 from above, so that the filler material 30 does not run out of the receiving region 21 as a result of the gravitational force. The air to be displaced from the cavities between the end portion 11 and the receiving region 21 during assembly can escape through correspondingly designed channels. The filler material 30 has to be designed for the specific environmental conditions, especially the thermo-mechanical loads.

Figure 2:
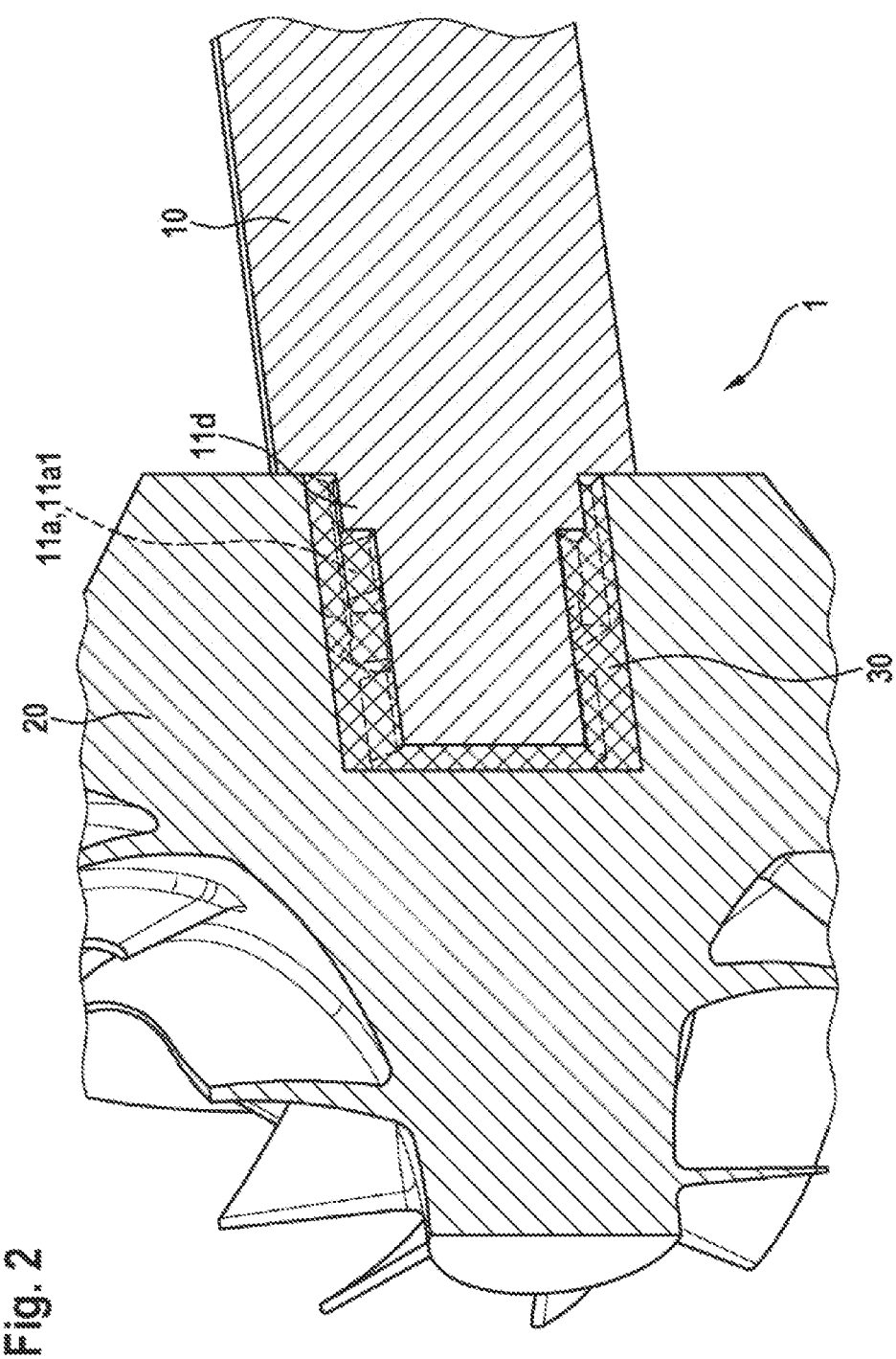
FIG. 2 shows a schematic representation of a shaft-hub connection in the assembled state.

FIG. 2 shows the shaft-hub connection 1 in the assembled or joined state. The filler material 30 has achieved its end configuration and fills the cavities between the receiving region 21 and the end portion 11. The filler material 30 is arranged to surround the connecting portion 11b here in order to generate undercuts with respect to the shaft 10 and the hub 20 which realize a form-fitting connection in the axial direction. However, the filler material 30 furthermore also surrounds the positioning portion 11a and the displacement portion 11c.

As a result of the filler material 30 filling the regions of play between the positioning portion 11a and the positioning region 21a in one embodiment, the torque transmission takes place without play via a splined shaft connection between the positioning portion 11a and the positioning region 21a.

In another embodiment, the filler material 30 fills the grooves 11a1 and through grooves 21a1 such that the filler material 30 produces form fitting connections in the direction of rotation between the shaft 10 and the hub 20, wherein these form fitting connections are also without play.

In both embodiments, the shaft-hub connection 1 is thus constructed to be very rigid. Therefore, a screw connection between the shaft 10 and the hub 20 is furthermore omitted. If the hub 20 is formed as a rotor wheel 20 of a turbine, a wheel hub 29 of the rotor wheel 20 which is arranged opposite the receiving region in the axial direction can be designed for optimum flow without having to take into account a screw connection here.

Figure 3:
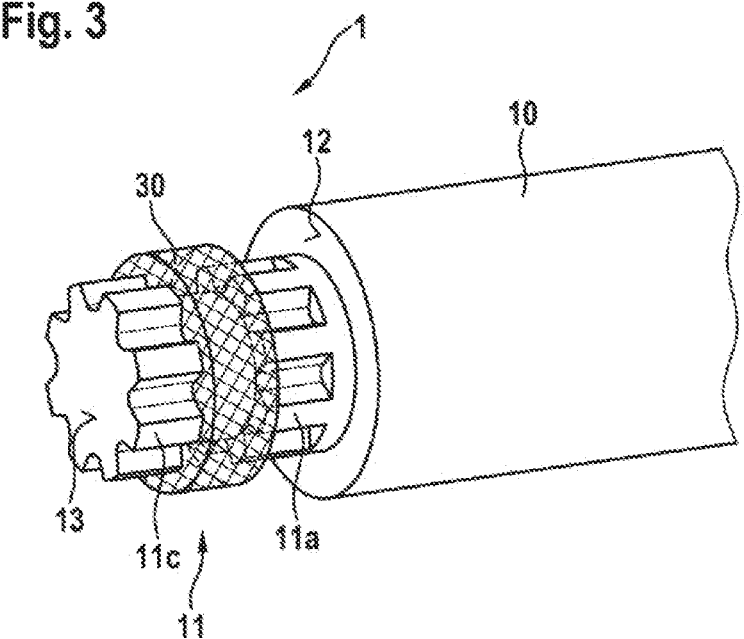
FIG. 3 shows a shaft-hub connection according to the invention in the assembled state, wherein the hub is hidden.

FIG. 3 shows a shaft-hub connection 1 according to the invention in the assembled state, wherein the hub 20 or rotor wheel 20 is hidden. The filler material 30 is arranged to surround the connecting portion 11b of the shaft 10 in a ring shape. This generates an axial form fit with respect to the geometry of the positioning region 21a of the hidden hub 20.

In the majority of the exemplary embodiments of the shaft-hub connection 1, the filler material 30 is also arranged to surround the displacement portion 11c and optionally also the positioning portion 11a in a ring shape. However, this has not been shown in the present FIG. 3 for illustrative reasons.

FIG. 4 shows a further exemplary embodiment of the shaft-hub connection 1 according to the invention in the assembled state, wherein the hub 20 is hidden. In contrast to the embodiment of FIG. 3, the displacement portion 11c is constructed cylindrically and the filler material 30 is arranged to partially surround the positioning portion 11a.

FIG. 5 shows a longitudinal section through the filler material in the pressed or assembled state. In this embodiment, the outer diameter $D_{11a}$ of the positioning portion 11a and the inner diameter $D_{21a}$ of the positioning region 21a are the same size. The inner surfaces 21a2 of the positioning region 21a thus cooperate with the outer surfaces 11a2 of the positioning portion 11a and therefore align the hub 20 coaxially with respect to the shaft 10.

Figure 6:
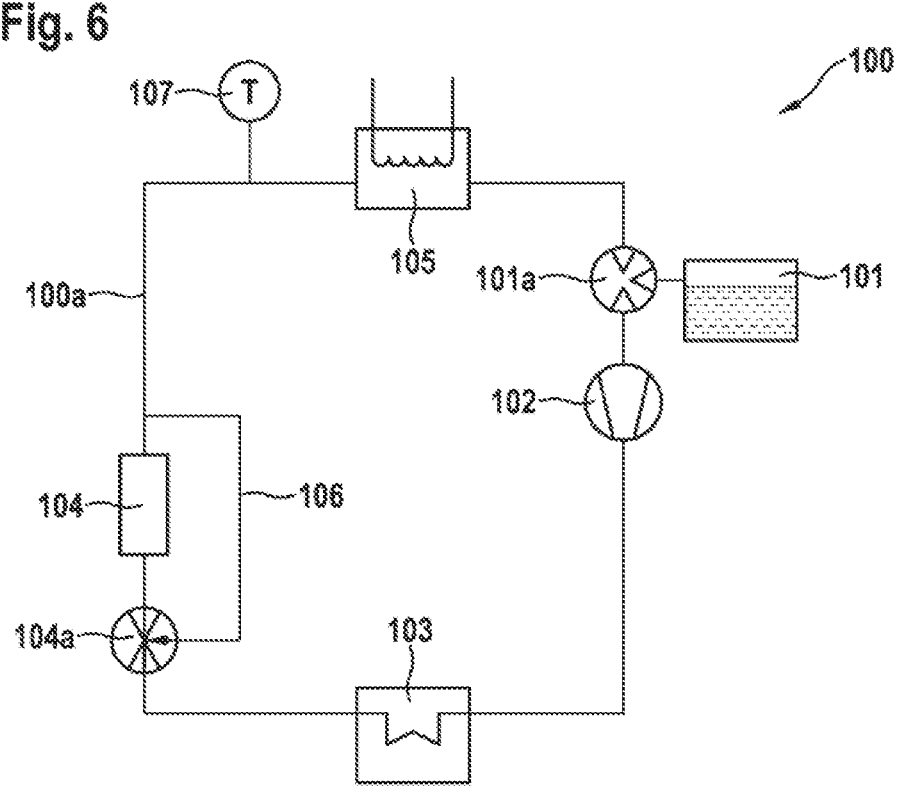
FIG. 6 shows a schematic representation of a waste heat recovery system.

FIG. 6 shows a waste heat recovery system 100. The waste heat recovery system 100 has a circuit 100a guiding a working medium, which comprises a pump 102, a compressor 103, a bypass valve 104a, an expansion machine 104 and a condenser 105 in the flow direction of the working medium. A collecting container 101 is connected to the circuit 100a via a valve arrangement 101a; alternatively, the collecting container can also be integrated in the circuit 100a.

A fluid working medium is conveyed by the pump 102 from the circuit 100a or from the collecting container 101 into the evaporator 103, where it is evaporated by the thermal energy of a waste gas of an internal combustion engine. The evaporated working medium is then depressurized in the expansion machine 104 whilst releasing mechanical energy, for example to a generator (not illustrated) or to a gear (not illustrated). The working medium is then liquefied again in the condenser 105 and guided back into the collecting container 101.

A bypass line 106 is optionally arranged in parallel to the expansion machine 104. Depending on the operating state of the internal combustion engine and resultant variables, for example temperatures of the working medium, the working medium is supplied to the expansion machine 104 through the bypass valve 104a or guided past the expansion machine through the bypass line 106. By way of example, a temperature sensor 107 is arranged upstream of the condenser 105. The temperature sensor 107 determines the temperature of the working medium upstream of the condenser 105 and transmits a corresponding signal to a control device (not illustrated). The control device controls the bypass valve 104a depending on various data, for example the temperature of the working medium upstream of the condenser 105.

According to the invention, the expansion machine 104 is formed as a turbine and comprises a rotor wheel 20, which is mounted on the shaft 10 by means of the shaft-hub connection 1, wherein the shaft 10 in this embodiment acts as an output shaft.

Figure 7:
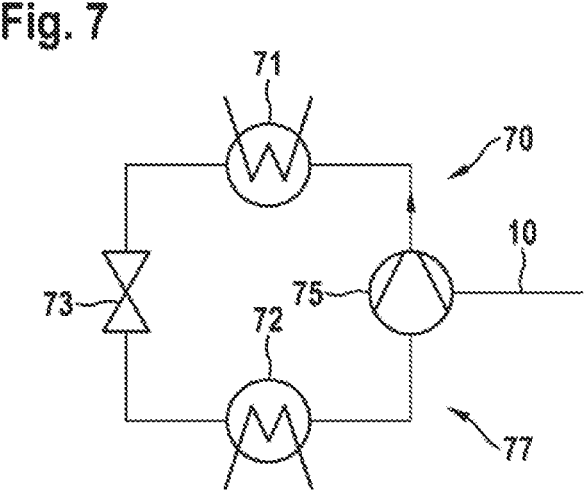
FIG. 7 shows a schematic representation of a heat pump.

FIG. 7 shows a schematic representation of an application of a shaft-hub connection 1 according to the invention in a turbine 75 of a heat pump 70, wherein the turbine 75 is operated as a compressor. A heat pump 70 has a working medium circuit 77 having a condenser 71, an evaporator 72, a throttle 73 or an expansion valve and a turbine 75.

The evaporator 72 evaporates a previously liquid working medium which is then compressed by the rotor wheel 20 of the turbine 75 and supplied to the condenser 71. Releasing thermal energy, for example into the heating system of a house, the working medium is liquefied again in the condenser 71. The working medium is then depressurized in the throttle 73 or via an expansion valve and supplied back to the evaporator 72.

According to the invention, the rotor wheel 20 of the turbine 75 is mounted on the shaft 10 by means of the shaft-hub connection 1 described above, wherein the shaft 10 in this embodiment acts as a drive shaft.

Figure 8:
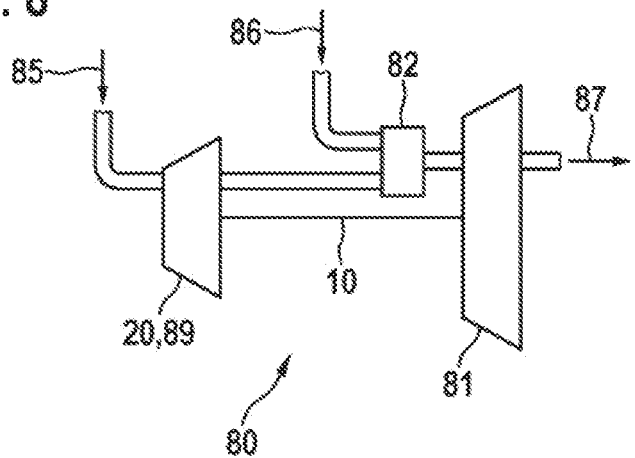
FIG. 8 shows a schematic representation of a micro gas turbine.

FIG. 8 shows a schematic representation of an application of a shaft-hub connection 1 according to the invention in a turbine 89, wherein the turbine 89 is operated as a compressor. A micro gas turbine 80 has a turbine impeller 81 and a turbine 89. The turbine impeller 81, like the rotor wheel 20 of the turbine 89, is arranged on the shaft 10. Combustion air 85 is compressed in the turbine 89 and supplied to a combustion chamber 82 of the micro gas turbine 80.

In the combustion chamber 82, the combustion air 85 is mixed with a fuel 86 and ignited and the turbine impeller 81 is consequently driven. Hot and depressurized waste gas 87 is produced. Then, in a recuperator (not illustrated), the exhaust gas 87 can be cooled and the combustion air 85 simultaneously pre-heated. The turbine impeller 81 drives the shaft 10 and, with it, also the rotor wheel 20 of the turbine 89.

According to the invention, the rotor wheel 20 of the turbine 89 and/or the turbine impeller 81 are mounted on the shaft 10 by means of the shaft-hub connection 1 described above.

Figure 9:
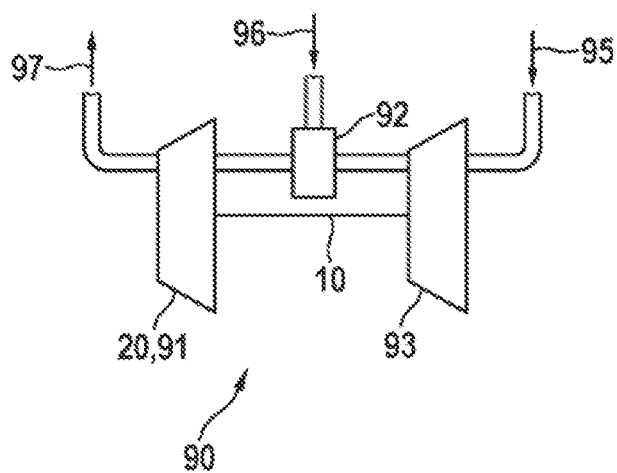
FIG. 9 shows a schematic representation of a further micro gas turbine.

FIG. 9 shows a schematic representation of a further application of the shaft-hub connection 1 according to the invention in a turbine 91. A micro gas turbine 90 has a turbine 91 having a rotor wheel 20, a compressor impeller 93 and a combustion chamber 92.

Like the compressor impeller 93, the rotor wheel 20 of the turbine 91 is possibly arranged on the shaft 10. Combustion air 95 is compressed in the compressor by the compressor impeller 93 and supplied to a combustion chamber 92 of the micro gas turbine 90. In the combustion chamber 92, the combustion air 95 is mixed with a fuel 96 and ignited and the rotor wheel 20 of the turbine 91 is consequently driven. Hot and depressurized waste gas 97 is produced. The rotor wheel of the turbine 91 drives the shaft 10, whereby the compressor impeller 93 is in turn driven.

According to the invention, the rotor wheel 20 of the turbine 91 and/or the compressor impeller 93 are mounted on the shaft 41 by means of a shaft-hub connection 1 described above.

Figure 10:
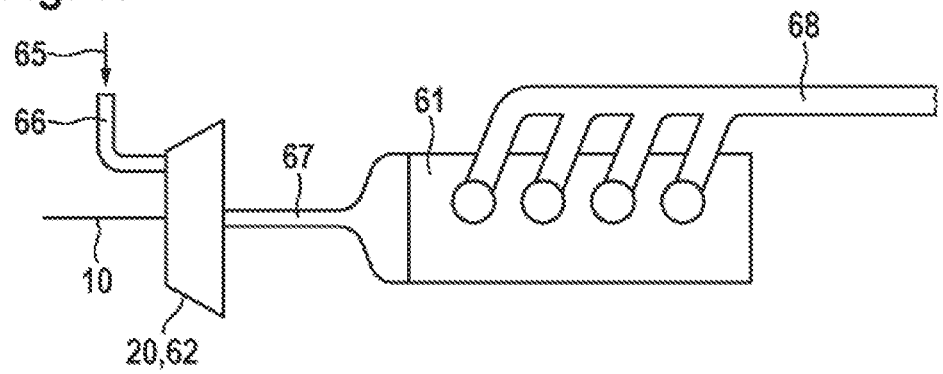
FIG. 10 shows a schematic representation of an internal combustion engine having an auxiliary compressor.

FIG. 10 shows a schematic representation of an arrangement of a turbine 62 having a rotor wheel 20 as an auxiliary compressor for an internal combustion engine 61. Combustion air 65 is supplied to the turbine 62 via a suction line 66 and compressed there by the rotor wheel 20. The compressed combustion air 65 is supplied to the internal combustion engine 61 via a pressure line 67. After the combustion process in the internal combustion engine 61, the waste gas is discharged through a waste gas tract 68. The hot waste gas in the waste gas tract 68 can also be used in further embodiments for pre-heating the combustion air in the suction line 66.

According to the invention, the rotor wheel 20 of the turbine 62 is mounted on the shaft 10 or drive shaft by means of the shaft-hub connection 1 described above.

The mode of operation of the shaft-hub connection 1 according to the invention is as follows:

The filler material 30 generates undercuts between the shaft 10 and the hub 20 both in the circumferential direction and in the axial direction. These undercuts are preferably without play so that forces and moments can be transmitted efficiently between the shaft 10 and the hub 20.

This shaft-hub connection 1 is especially suitable for comparatively small constructions, for example small turbines 62, 75, 89, 91, wherein the rotor wheel 20 of the turbine 62, 75, 89, 91 is mounted on the corresponding shaft 10 by means of the shaft-hub connection 1.

It is especially the case for small sized rotor wheels 20 that a screw connection to the shaft 10 is barely possible owing to the lack of installation space. Furthermore, particularly with small sizes, it is highly advantageous to design the wheel hub 29 to promote the flow, which cannot be optimally achieved with a screw connection.

In specific applications in which rotor wheels 20 have to be attached to both ends of the shaft 10, an additional problem would arise during the assembly of the second rotor wheel 20 in that the connection formed by the shaft 10 and the first rotor wheel 20 would need to be fastened to generate a screw connection with a corresponding prestress or tightening moment. Owing to the delicate structure, it would be very disadvantageous or barely possible to secure the first rotor wheel 20 since this would lead to deformations or damage of the rotor wheel 20. The geometry of the rotor wheel 20, especially with small sizes, is not particularly suitable for using tensioning means for assembly.

In contrast, the shaft-hub connection 1 according to the invention moves the connection between the rotor wheel 20 and the shaft 10 into the hub 20 or into the rotor wheel 20. An additional material (e.g. metal with a low melting point, casting compound, adhesive, elastomer), namely the filler material 30, is melted by an external heat source or added in liquid form here and, through the insertion of the end portion 11 of the shaft 10 into the hub 20, is pushed into the corresponding cavities such that a radial and axial form-fitting connection is produced between the end portion 11 of the shaft 10 and the receiving region 21 of the hub 20.

In the case of a melted filler material 30, this then solidifies again; other filler materials 30 such as elastomers or various granulates, achieve their end strength or end configuration—possibly following a chemical reaction—through a thermal treatment after the joining procedure.

The advantages of the shaft-hub connection 1 generated in this way are:

simultaneous radial and axial form fit between the shaft 10 and the hub 20;

economical connection;

high precision of the radial and axial positioning of the shaft 10 with respect to the hub 20;

considerable reduction in installation space compared to conventional connecting techniques;

wheel entry geometry or wheel hub 29 can be optimally designed in terms of flow guidance;

large selection of potential filler materials 30 depending on the application;

it is even possible to achieve further functions, for example damping, by means of the special filler materials 30.

The invention claimed is:

1. A shaft-hub connection (1) comprising a shaft (10), a hub (20) and a filler material (30), wherein the shaft (10) comprises an end portion (11) at one end, wherein a receiving region (21) is arranged in the hub (20), characterized in that the end portion (11) is arranged in the receiving region (21) with the interposition of the filler material (30), wherein the filler material (30) fills geometries in the receiving region (21) and on the end portion (11) to create a form-fit between the shaft (10) and the hub (20) and to prevent axial and rotational movement of the shaft (10) relative to the hub (20), wherein the end portion (11) has a positioning portion (11a), wherein the filler material (30) fills geometries on the positioning portion (11a), wherein the receiving region (21) has a positioning region (21a), wherein the filler material (30) fills geometries formed on the positioning region (21a), wherein an outer diameter $D_{11a}$ of the positioning portion (11a) is the same size as an inner diameter $D_{21a}$ of the positioning region (21a).

2. The shaft-hub connection (1) as claimed in claim 1, characterized in that the positioning region (21a) is arranged to surround the positioning portion (11a) externally.

3. The shaft-hub connection (1) as claimed in claim 1, characterized in that at least one undercut surface (21a3) is formed on the positioning region (21a), wherein the filler material (30) engages the at least one undercut surface (21a3) to prevent axial movement of the shaft (10) relative to the hub (20).

4. The shaft-hub connection (1) as claimed in claim 3, characterized in that the end portion (11) has a connecting portion (11b) adjacent to the positioning portion (11a) and a displacement portion (11c) adjoining said connecting portion, wherein at least one undercut surface (11c3) is formed on the displacement portion (11c), wherein the filler material (30) engages the at least one axial surface (11c3) to prevent axial movement of the shaft (10) relative to the hub (20).

5. The shaft-hub connection (1) as claimed in claim 1, characterized in that an end face (22) formed on the hub (20) cooperates with a shoulder (12) formed on the shaft (10) in the axial direction of the shaft (10).

6. The shaft-hub connection (1) as claimed in claim 1, characterized in that the filler material (30) consists of a casting compound.

7. A turbine (62, 75, 89, 91) having a rotor wheel (20) arranged on a shaft (10) by a shaft-hub connection (1) as claimed in claim 1.

8. A waste heat recovery system (100) having a circuit (100a) guiding a working medium, wherein the circuit (100a) comprises a pump (102), an evaporator (103), a bypass valve (1), an expansion machine (104) and a condenser (105) in the flow direction of the working medium, wherein the expansion machine (104) is formed as the turbine as claimed in claim 7.

9. A heat pump (70) having a condenser (71), an evaporator (72) and the turbine (75) as claimed in claim 7, wherein the rotor wheel (20) acts as a compressor between the evaporator and the condenser.

10. A micro gas turbine (80) having a turbine (89) as claimed in claim 7, wherein the rotor wheel (20) acts as compressor for a turbine impeller of the micro gas turbine.

11. A micro gas turbine (90) having a turbine (91) as claimed in claim 7, wherein the rotor wheel acts as a turbine impeller of the micro gas turbine (90).

12. An internal combustion engine (61) having a turbine as claimed in claim 7, wherein the rotor wheel (20) acts as an auxiliary compressor for compressing the combustion air (65) supplied to the internal combustion engine (61).

13. The shaft-hub connection (1) as claimed in claim 1, characterized in that the end portion (11) has a positioning portion (11a), wherein the geometries on the end portion (11) are formed on the positioning portion (11a), and wherein the geometries on the end portion are formed as grooves (11a1) in the axial direction.

14. The shaft-hub connection (1) as claimed in claim 13, characterized in that the receiving region (21) has a positioning region (21a), wherein the geometries in the receiving region (21) are formed on the positioning region (21a), and wherein the geometries in the receiving region are formed as through grooves (21a1) in the axial direction.

15. The shaft-hub connection (1) as claimed in claim 1, characterized in that the filler material (30) consists of a casting compound, wherein the casting compound can harden independently.

16. The shaft-hub connection (1) as claimed in claim 4, wherein the displacement portion (11c) has therein grooves (11c1) extending in the axial direction.

17. A shaft-hub connection (1) comprising a shaft (10), a hub (20) and a filler material (30), wherein the shaft (10) comprises an end portion (11) at one end, wherein a receiving region (21) is arranged in the hub (20), characterized in that the end portion (11) is arranged in the receiving region (21) with the interposition of the filler material (30), wherein the end portion (11) has a positioning portion (11a), a displacement portion (11c), and a connecting portion (11b) between the positioning portion (11a) and the displacement portion (11c), wherein the positioning portion (11a) includes a plurality of grooves (11a1) extending in an axial direction of the shaft (10), wherein the displacement portion (11c) has therein a plurality of grooves (11c1) extending in the axial direction, wherein the hub includes an undercut region (21b) and a positioning region (21a) having through grooves (21a1) in the axial direction and forming at least one undercut surface (21a3), wherein the filler material (30) fills the grooves (11a1, 11c1) of the positioning portion (11a) and the displacement portion (11c) and the through grooves of the positioning region (21a) to create a form-fit between the shaft (10) and the hub (20) and to prevent axial and rotational movement of the shaft (10) relative to the hub (20), wherein an outer diameter $D_{11a}$ of the positioning portion (11a) is the same size as an inner diameter $D_{21a}$ of the positioning region (21a) and the positioning region (21a) surrounds the positioning portion (11a).

18. A shaft-hub connection (1) comprising a shaft (10), a hub (20) and a filler material (30), wherein the shaft (10) comprises an end portion (11) at one end, wherein a receiving region (21) is arranged in the hub (20), wherein the end portion (11) has a positioning portion (11a), wherein the receiving region (21) has a positioning region (21a), characterized in that the end portion (11) is arranged in the receiving region (21) with the interposition of the filler material (30), wherein the filler material (30) fills geometries in the positioning region (21a) and on the positioning portion (11a) to create a form-fit between the shaft (10) and the hub (20) and to prevent axial and rotational movement of the shaft (10) relative to the hub (20), and wherein an outer diameter $D_{11a}$ of the positioning portion (11a) is the same size as an inner diameter $D_{21a}$ of the positioning region (21a).

* * * * *